AMPLITUDE LIMITING CIRCUIT
Filed Oct. 17, 1960
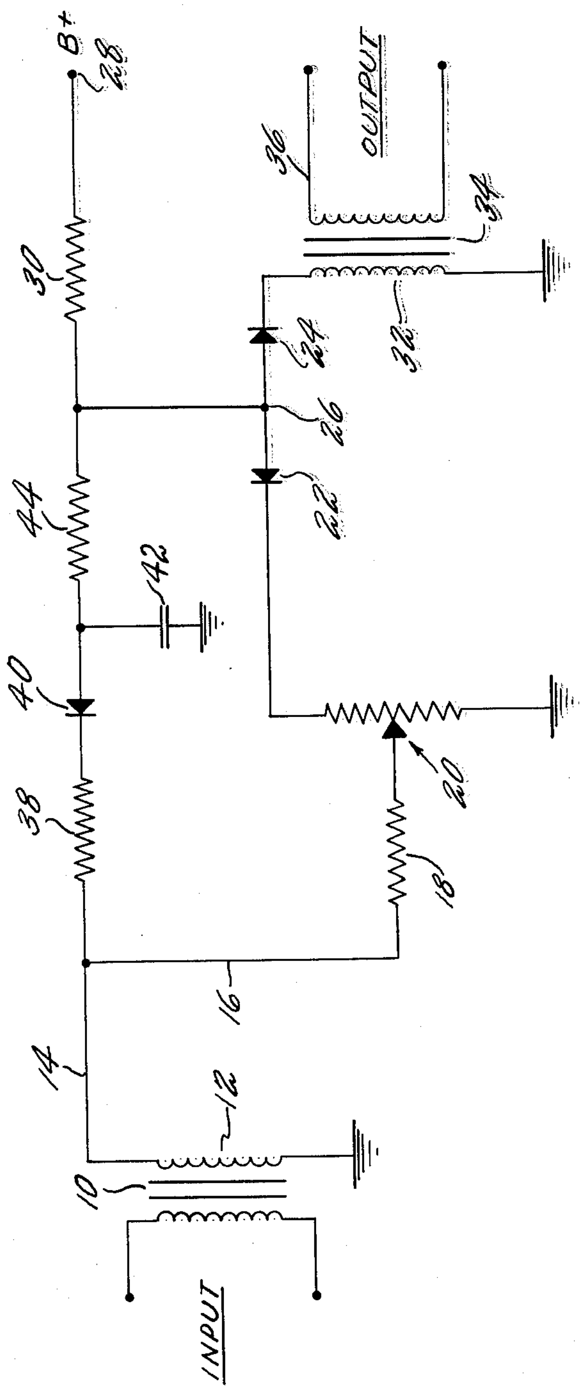
INVENTOR
WILLIAM C. PECK
BY Donald F. Bradley
AGENT United States Patent Office 3,139,587

Patented June 30, 1964

3,139,587
AMPLITUDE LIMITING CIRCUIT

William C. Peck, Hazardville, Conn., assignor to United Aircraft Corporation, East Hartford, Conn., a corporation of Delaware Filed Oct. 17, 1960, Ser. No. 63,196
4 Claims. (Cl. 328—171)

This invention relates to an electronic circuit and particularly to a circuit for preventing transmission of signals above a certain magnitude.

In control systems or servo-mechanisms which control position, speed, temperature or some other parameter of operation of a system, it is often important to include in the system components which will prevent a malfunction in the system from adversely affecting the operation of the system. In particular, automatic pilots in aircraft normally include provisions which sense failures in critical circuits and react to such failures either by disconnecting the circuits from the system or by providing an independent signal to take over command in the absence of the original signal. This invention is directed primarily to a flight control system, but finds application in many other fields as well.

The circuit of the invention is one that is normally responsive to error signals. The error signals may represent deviations in rudder or elevator position from a predetermined value, or in automatic pilots, may indicate deviations in the attitude of the aircraft from preselected conditions of yaw, pitch, or roll. The error signal will actuate a servomotor, which will then correct for the error by repositioning one of the control surfaces or systems of the aircraft.

In such control systems, the error signals are normally limited to a certain range of values so that a large error signal will not cause hardover control signals which may have detrimental or even catastrophic effects. Error signals over a certain value are not possible in some systems if the system is functioning properly. Therefore, if the control system does produce an error signal above a certain value, it is obvious that a failure has occurred some place in the system. The circuit of this invention will sense when such a failure has occurred.

It is, therefore, an object of this invention to provide an electronic circuit which will pass an input signal only when the input signal is within a predetermined range.

Another object of this invention is an electronic circuit which will pass an input signal when the input signal is below a predetermined value but which becomes inoperative when the input signal is above the predetermined value.

A further object of this invention is a fail-safe electronic circuit which will react only to input signals within a specified range.

Another object of this invention is an electronic circuit for use in a control system which will sense a malfunction in the control system and prevent further operation by thereupon prohibiting passage of control signals.

Other objects and a fuller understanding of the invention may be had by referring to the following description and claims, taken in conjunction with the accompanying drawing in which the figure is a schematic representation of the electronic circuitry of this invention.

The operation of the circuit is best explained by referring to the figure. An error signal from the preceding stage is applied through transformer 10 to secondary winding 12. The error signal is an alternating current signal of perhaps .5 volt R.M.S. The input signal is conducted from secondary winding 12 through line 14, line 16, resistor 18, and potentiometer 20. A pair of back-to-back diodes 22 and 24 are normally biased to conduction by a positive D.C. potential connected to junction 26 and supplied by a source of D.C. potential 28 through resistor 30. Resistor 30 is normally very large so that most of the voltage drop will be across resistor 30. When diodes 22 and 24 are forward biased, the A.C. input error signal will pass through the diodes to primary winding 32 of output transformer 34. Secondary transformer winding 36 will conduct the output A.C. voltage to the next succeeding stage.

At the same time that the input error signal is being conducted through diodes 22 and 24, the negative half of the input error signal is conducted through resistor 38 and diode 40 to charge capacitor 42 to some small negative voltage. Resistor 38 is very small compared to resistors 30 and 44. During normal operating conditions, the negative voltage on capacitor 42, due to the rectification of the error signal by diode 40, is not large enough to overcome the effects of direct current source 28, and junction 26, which will now be at a potential determined by the voltage drop across resistors 30 and 44, will remain slightly positive and diodes 22 and 24 will remain conductive. Resistor 44 will ordinarily be much smaller than resistor 30. If a failure occurs in a preceding stage, and the error signal now becomes much larger, capacitor 42 will now charge to a much greater negative potential and override the positive bias from source 28 so that junction 26 will swing negative. When this occurs, diodes 22 and 24 will become reverse biased and, therefore, non-conductive, and the input error signal will be unable to pass through diodes 22 and 24. No output will then occur across winding 32.

It can, therefore, be seen that the circuit of this invention will react in normal fashion and will pass the input signal to the following stage when the input error signal is within the normal range of operation. However, if by reason of malfunction the input error signal becomes large, the circuit will not pass any signal. The only adjustment for this circuit consists of setting the wiper of potentiometer 20 until the desired fade-out characteristics are obtained for the required magnitude of the input error signal.

It is to be understood that the invention is not limited to the specific embodiment herein illustrated and described, but may be used in other ways without departure from its spirit as defined by the following claims.

I claim:

1. A control circuit for passing signals only when the signals are below a preselected magnitude comprising means to supply an input signal of varying amplitude, an output circuit, a first circuit path including a pair of back-to-back series diodes for conducting said input signal to said output circuit, means for supplying a biasing signal to the junction between said diodes to render said diodes normally conductive, and a second circuit path including a series rectifier and a capacitor connecting said input signal with said biasing means, said rectifier conducting a portion of said input signal and varying said biasing signal to render said diodes nonconductive when said input signal is above a preselected magnitude.

2. A control circuit for passing signals only when the signals are below a preselected magnitude comprising means to supply an input signal of varying amplitude, an output circuit, a first circuit path including a pair of series diodes connected back to back for conducting said input signal to said output circuit, a source of supply voltage independent of said input signal connected to the common junction between said diodes for biasing said diodes into conduction, and a second circuit path including a series rectifier and a shunt capacitor connecting said input signal with said supply voltage, said second path conducting when said input signal is above a preselected magnitude and varying said biasing signal to thereby render said first path nonconductive.

3. A control circuit for passing a control signal only when the control signal is below a preselected value comprising means supplying a variable amplitude input signal, an output circuit, a first circuit including a switch having a pair of series diodes connected back to back for conducting said input signal to said output circuit, biasing means producing a biasing signal connected to the junction between said back-to-back series diodes for maintaining said switch in a normally closed condition, a second circuit independent of said first circuit and including a rectifier for conducting at least a portion of said input signal and charging a capacitor to a voltage which is a function of the magnitude of said input signal, and means connecting said capacitor with said biasing means for overriding said biasing signal and opening said switch when said input signal is above a preselected value.

4. A control circuit for passing a control signal only when the control signal is below a preselected value comprising input signal supply means, a first circuit path including a pair of back-to-back series diodes for conducting said input signal to an output circuit, biasing means connected to the junction between said diodes for rendering said diodes normally conductive, a second circuit path including a series rectifier and a capacitor for conducting at least a portion of said input signal, said capacitor receiving a charge proportional to the magnitude of said input signal, and means connecting said biasing means with said second circuit path for varying said bias and rendering said pair of diodes non-conductive when said input signal is above a preselected value.

References Cited in the file of this patent

UNITED STATES PATENTS

| | | |
|---|---|---|
| 2,098,370 | Bartels | Nov. 9, 1937 |
| 2,493,045 | Toth | Jan. 3, 1950 |
| 2,519,890 | Crosby | Aug. 22, 1950 |
| 2,657,318 | Rack | Oct. 27, 1953 |
| 2,782,303 | Goldberg | Feb. 19, 1957 |
| 2,858,433 | Rector | Oct. 28, 1958 |
| 2,982,867 | Wennerberg | May 2, 1961 |
| 2,985,836 | Hatton | May 23, 1961 |
| 3,069,562 | Steele | Dec. 18, 1962 |